US011322270B2

(12) United States Patent
Mizushita et al.

(10) Patent No.: US 11,322,270 B2
(45) Date of Patent: May 3, 2022

(54) WIRE HARNESS AND METHOD OF MANUFACTURING WIRE HARNESS

(71) Applicant: Sumitomo Wiring Systems, Ltd., Mie (JP)

(72) Inventors: Masaki Mizushita, Mie (JP); Yuya Fukami, Mie (JP); Kenta Ito, Mie (JP); Motohiro Yokoi, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 30 days.

(21) Appl. No.: 16/650,567

(22) PCT Filed: Dec. 13, 2018

(86) PCT No.: PCT/JP2018/045790
§ 371 (c)(1),
(2) Date: Mar. 25, 2020

(87) PCT Pub. No.: WO2020/121463
PCT Pub. Date: Jun. 18, 2020

(65) Prior Publication Data
US 2021/0225555 A1    Jul. 22, 2021

(51) Int. Cl.
*H01B 7/04*     (2006.01)
*H01B 7/00*     (2006.01)
(Continued)

(52) U.S. Cl.
CPC ....... *H01B 7/0045* (2013.01); *B60R 16/0207* (2013.01); *H01B 13/01209* (2013.01)

(58) Field of Classification Search
CPC ............................ H01R 33/00; B60R 16/02
See application file for complete search history.

(56) References Cited

U.S. PATENT DOCUMENTS

2002/0111048 A1* 8/2002 Kondoh ............. B60R 16/0207
                                                                 439/34
2017/0313266 A1   11/2017 Mizuno et al.

FOREIGN PATENT DOCUMENTS

JP      H11-342805 A      12/1999
JP      2004-175266 A     6/2004
JP      2016-88408 A      5/2016

OTHER PUBLICATIONS

Japanese Official Action received in JP Application No. 2019-568270, dated Mar. 16, 2021 and English language translation thereof.

(Continued)

*Primary Examiner* — William H. Mayo, III
*Assistant Examiner* — Krystal Robinson
(74) *Attorney, Agent, or Firm* — Greenblum & Bernstein, P.L.C.

(57)    ABSTRACT

A wire harness includes: a first wiring member including a plurality of first linear transmission members and at least one first intermediate connector, some of the plurality of first linear transmission members being connected to the first intermediate connector; and a second wiring member including at least one second linear transmission member and a second intermediate connector to which the at least one second linear transmission member is connected. The first intermediate connector and the second intermediate connector are connected to each other, thus at least one part member of plurality of first linear transmission members which are connected to the first intermediate connector are connected to at least one second linear transmission member.

12 Claims, 12 Drawing Sheets

(51) Int. Cl.
*B60R 16/02* (2006.01)
*H01B 13/012* (2006.01)

(56) References Cited

OTHER PUBLICATIONS

India Official Action received in Application No. 202017009487, dated Nov. 19, 2020.
International Search Report issued in International Patent Application No. PCT/JP2018/045790, dated Mar. 5, 2019, with English translation.
Japan Official Action received in JP2019-568270, dated Jun. 30, 2020 and English language translation.

\* cited by examiner and at least one first intermediate connector, some of the plurality of first linear transmission members being connected to the first intermediate connector; and at least one second wiring member including at least one second linear transmission member and a second intermediate connector to which the at least one second linear transmission member is connected, wherein the first intermediate connector and the second intermediate connector are connected to each other, thus at least one part member of the plurality of first linear transmission members which are connected to all the first intermediate connector are connected to the at least one second linear transmission member included in the second wiring member.

The wire harness according to a second aspect is the wire harness according to the first aspect, wherein the first wiring member includes the plurality of first intermediate connectors, the wire harness includes the plurality of second wiring members, and the second intermediate connector in the second wiring member is connected to each of the plurality of first intermediate connectors.

The wire harness according to a third aspect is the wire harness according to the first or second aspect, wherein in the first wiring member, the plurality of first linear transmission members are gathered in a state where a branch part is branched from a main line, and the first intermediate connector is provided on at least one of one end portion of the main line, another end portion of the main line, and an end portion of the branch part.

The wire harness according to a fourth aspect is the wire harness according to the third aspect, wherein the first intermediate connector is provided in each of the one end portion of the main line, the another end portion of the main line, and the end portion of the branch part, and the second intermediate connector in the second wiring member is connected to the first intermediate connector provided in each of the one end portion of the main line, the another end portion of the main line, and the end portion of the branch part.

The wire harness according to a fifth aspect is the wire harness according to the third or fourth aspect, wherein the first intermediate connector is provided on the end portion of the branch part, and a length dimension of the branch part is equal to or smaller than 5 cm.

The wire harness according to a sixth aspect is the wire harness according to any one of the first to fifth aspects, wherein the first wiring member includes a sheet material to which the plurality of first linear transmission members are fixed.

The wire harness according to a seventh aspect is the wire harness according to any one of the first to sixth aspects further includes a support part for supporting the first wiring member in an inner side of an installment panel.

The wire harness according to an eighth aspect is the wire harness according to the seventh aspect, wherein the support part supports the first wiring member along a reinforcement.

The wire harness according to a ninth aspect is the wire harness according to any one of the first to eighth aspects, wherein the first wiring member includes, as the plurality of first linear transmission members, wiring members for all electrical components each having a possibility of connection in a plurality of specifications.

In order to solve the above problem, a method of manufacturing a wire harness according to a tenth aspect includes: a step (a) of preparing a first wiring member including a plurality of first linear transmission members and a first intermediate connector, some of the plurality of first linear transmission members being connected to the first intermediate connector; a step (b) of preparing a plural types of second wiring members, the second wiring members include at least one second linear transmission member and a second intermediate connector to which the at least one second linear transmission member is connected, and the plural types have different combinations of connection between the plurality of first linear transmission members connected to the first intermediate connector and the at least one second linear transmission member in a state where the second intermediate connector is connected to the first intermediate connector, and a step (c) of selecting one of the plural types of second wiring members and connecting the second intermediate connector to the first intermediate connector.

The wire harness according to an eleventh aspect is the wire harness includes: a plurality of first linear transmission members independently provided to correspond to a plurality of electrical components; a first intermediate connector to which some of the plurality of first linear transmission members are connected; and at least one second linear transmission member having one side connected to one of the electrical components and another side connected to a second intermediate connector, wherein, via a connection of the first intermediate connector second intermediate connector the second linear transmission member is independently connected to the first linear transmission member thus one of the electrical components connected to the second linear transmission member and the first linear transmission member are connected to each other.

Effects of the Invention

According to the first aspect, at least one part member of the plurality of first linear transmission members which are connected to the first intermediate connector can be connected to the electrical component via at least one second linear transmission member. Thus, a redundant circuit and a redundant terminal connector in the second wiring member can be reduced as much as possible in the specification that at least one part member of the plurality of first linear transmission members which are connected to the first intermediate connector are connected to the electrical component and the remaining members are not connected to the electrical component.

When the combination of connection between the plurality of first linear transmission members connected to the first intermediate connector and at least one second linear transmission member is changed or the linear transmission member is added in the second wiring member, the first linear transmission member which is not connected to the electrical component in one specification can be connected to the other electrical component in the other specification. In this case, the first wiring member is communalized to the plurality of specifications. The second wiring member is designed and manufactured in accordance with the plurality of specifications, however, they become small in scale, thus can easily correspond to the difference in the specifications. Thus, the second wiring member can easily correspond to the difference in the specifications of automobiles while enabling a reduction in a redundant circuit and a redundant terminal connector as much as possible.

According to the second aspect, the first wiring member includes the plurality of first intermediate connectors, and the second intermediate connector in the second wiring member is connected to each of the plurality of first intermediate connectors. Thus, each of the plurality of second wiring members can correspond to the difference in the specifications in accordance with the difference of electrical components to which the plurality of first intermediate connectors are connected. Thus, the above aspect contributes to a reduction in the overall number of part numbers in the wire harness.

According to the third aspect, the first wiring member in which the plurality of first linear transmission members are gathered in the state where the branch part is branched from the main line can be communalized to the plurality of specifications. Thus, the review of the number of design processes corresponding to the difference in the specifications needs not be frequently performed, and it is easy to correspond to the difference in the specifications of the automobiles.

According to the fourth aspect, the first intermediate connector is provided in each of the one end portion of the main line, the another end portion of the main line, and the end portion of the branch part, and the second intermediate connector in the second wiring member is connected to the first intermediate connector provided in each of the one end portion of the main line, the another end portion of the main line, and the end portion of the branch part. Thus, each of the plurality of second wiring members can correspond to the difference in the specifications in accordance with the difference of electrical components to which the one end portion of the main line, the other end portion of the main line, and the end portion of the branch part are connected. Thus, the above aspect contributes to a reduction in the overall number of part numbers in the wire harness.

According to the fifth aspect, the length of the end portion of the branch part is equal to or smaller than 5 cm, thus the first wiring member can be easily manufactured.

According to the sixth aspect, the plurality of first linear transmission members can be gathered as flatly as possible.

The wire harness for the installment panel has much to be connected, thus has the large difference in the specifications. According to the seventh aspect, it is possible to easily correspond to the difference in the specifications of automobiles with regard to the wire harness for the installment panel having the large difference in the specifications while enabling a reduction in a redundant circuit and a redundant terminal connector as much as possible.

According to the eighth aspect, the position of the first intermediate connector can be grasped using the reinforcement as a lead.

According to the ninth aspect, the first wiring member includes, as the plurality of first linear transmission members, wiring members for all the electrical components each having a possibility of connection in the plurality of specifications, thus the first wiring member can be communalized to all the specifications.

According to the tenth aspect, it is possible to select one of the plural types of second wiring members and connect all or at least one part member of plurality of first linear transmission members which are connected to the first intermediate connector to the electrical component via at least one second linear transmission member. Thus, redundant circuit and a redundant terminal connector in the second wiring member can be reduced as much as possible.

The first wiring member is communalized to the plurality of specifications. The plural types of second wiring members are designed and manufactured in accordance with the plurality of specifications, however, they become small in scale, thus can easily correspond to the difference in the specifications. Thus, the second wiring member can easily correspond to the difference in the specifications of automobiles while enabling a reduction in a redundant circuit and a redundant terminal connector as much as possible.

DESCRIPTION OF EMBODIMENT(S)

First Embodiment

A wire harness and a method of manufacturing the wire harness according to a first embodiment are described hereinafter.

Assumed is a case where there are a plurality of specifications in automobiles, and examples of wire harnesses directed to each specification are described for explanatory convenience. Herein, a difference in specifications in the automobiles indicates a case where a condition of an electrical component such as presence or absence and an arrangement thereof is different.

Figure 1:
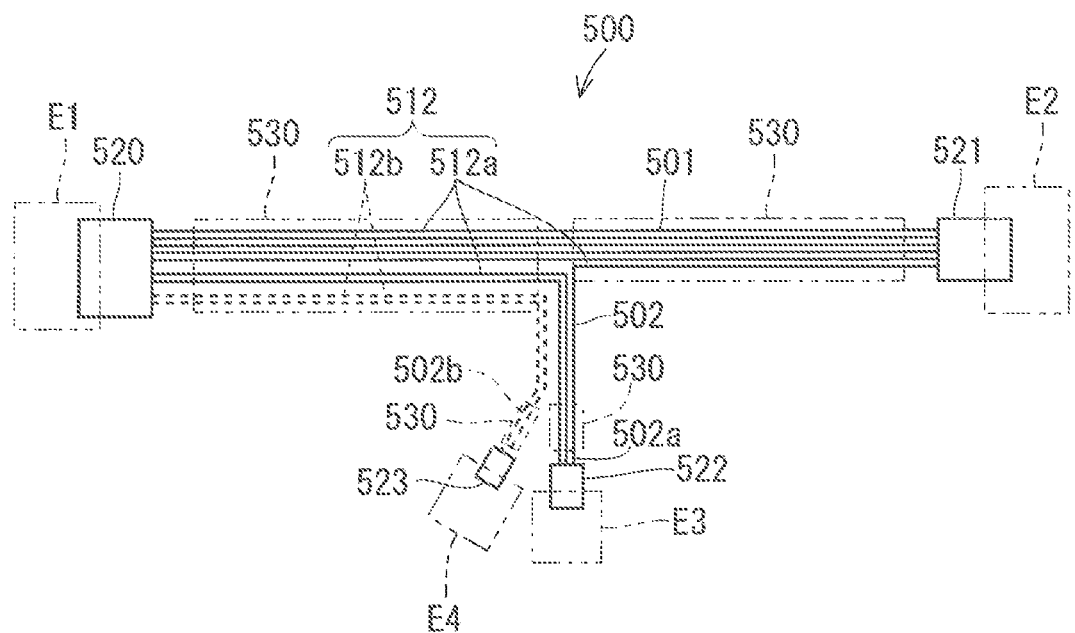
FIG. 1 A schematic view illustrating an example of a wire harness.
Figure 2:
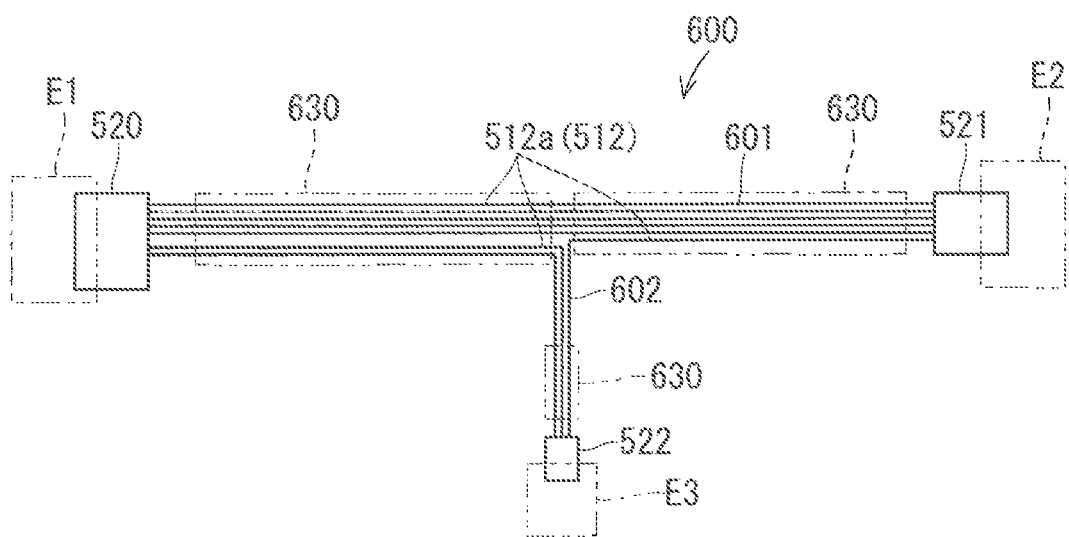
FIG. 2 A schematic view illustrating another example of the wire harness.

FIG. 1 and FIG. 2 are schematic views illustrating two types of wire harnesses 500 and 600 mounted to automobiles having different specifications, respectively. FIG. 1 is based on an assumption of a specification that electrical components E1 and E2 are provided in separated positions in an automobile, and electrical components E3 and E4 are set in positions halfway through a path between the electrical components E1 and E2 or positions separated from the positions halfway through the path. FIG. 2 is based on an assumption of a specification that electrical components E1 and E2 are provided in separated positions, and electrical component E3 is set in a position halfway through the path between the electrical components E1 and E2 or a position separated from the position halfway through the path. That is to say, the specification illustrated in FIG. 2 is different from the specification illustrated in FIG. 1 in that the electrical component E4 is omitted. Electrical components mounted to each unit in the automobile such as various apparatuses mounted to the installment panel are assumed as the electrical components E1, E2, E3, and E4, and assumed are a power source component, an electronic control unit, a motor, a display device, a switch, a light emitting part, a heater, and a sensor, for example. The electrical component is a power supply source, a power supply destination, a component performing control, a component to be controlled, and a component to and from which a signal is transmitted. A component merely transmitting an electrical power or a signal (such as a connector) is excluded.

The wire harness 500 is made up of a plurality of electrical wires 512 branched and bundled. Herein, the plurality of electrical wires 512 are bundled in a state where a branch part 502 is branched halfway through a path of one main line 501. Terminal connectors 520 and 521 are connected to both end portions of the main line 501. The branch part 502 is branched into two secondary branch parts 502a and 502b halfway through the path toward a tip end side, and terminal connectors 522 and 523 are connected to each end portion of the secondary branch parts 502a and 502b. Some electrical wires 512a of the plurality of electrical wires 512 are electrical wires connected to the electrical components E1, E2, and E3. The other some electrical wires 512b of the plurality of electrical wires 512 are electrical wires connecting the electrical component E4 to the other electrical component (the electrical component E1 in FIG. 1). A corrugated tube, a resin sheet, or an adhesive tape, for example, as a protection member 530 for protection is externally mounted on the main line 501, the branch part 502, and the secondary the branch parts 502a and 502b.

The terminal connector 520 is connector-connected to the electrical component E1, the terminal connector 521 is connector-connected to the electrical component E2, the terminal connector 522 is connector-connected to the electrical component E3, and the terminal connector 523 is connector-connected to the electrical component E4.

The wire harness 600 is made up of a plurality of electrical wires 512a branched and bundled. Herein, the plurality of electrical wires 512a are bundled in a state where a branch part 602 is branched halfway through a path of one main line 601. The wire harness 600 needs not be connected to the electrical component E4, thus electrical wires 512b, which are provided to be connected to the electrical component E4, of the plurality of electrical wires 512 in the wire harness 500 are omitted. The electrical wires 512b are omitted, thus the branch part 602 is not branched halfway through but extends, and the terminal connector 522 is connected to an end portion of the branch part 602. The terminal connector 523 in the wire harness 500 is omitted. A corrugated tube, a resin sheet, or an adhesive tape, for example, as a protection member 630 for protection is externally mounted on the main line 601 and the branch part 602.

The terminal connector 520 is connector-connected to the electrical component E1, the terminal connector 521 is connector-connected to the electrical component E2, and the terminal connector 522 is connector-connected to the electrical component E3.

The wire harness 500 is used in common in the specification illustrated in FIG. 1 and the specification illustrated in FIG. 2. In this case, when the wire harness 500 is used in the specification illustrated in FIG. 2, the electrical wire 512b is a redundant circuit. The terminal connector 523 is a redundant terminal connector. Moreover, the protection member 530 attached to the secondary branch part 5021 is also redundant.

The wire harness 500 is used for the specification illustrated in FIG. 1, and the wire harness 600 is used for the specification illustrated in FIG. 2. In this case, the two types of wire harnesses 500 and 600 need to be designed and manufactured. The wire harnesses 500 and 600 are made up of the plurality of electrical wires 512a and 512b branched and bundled, thus it takes an immense amount of work to review the number of design processes for efficiently manufacturing such wire harnesses while reducing a tangle, for example. The wire harness according to the present embodiment relates to a technique capable of easily corresponding to a difference in specifications of automobiles while enabling a reduction in a redundant circuit and a redundant terminal connector as much as possible.

Figure 3:
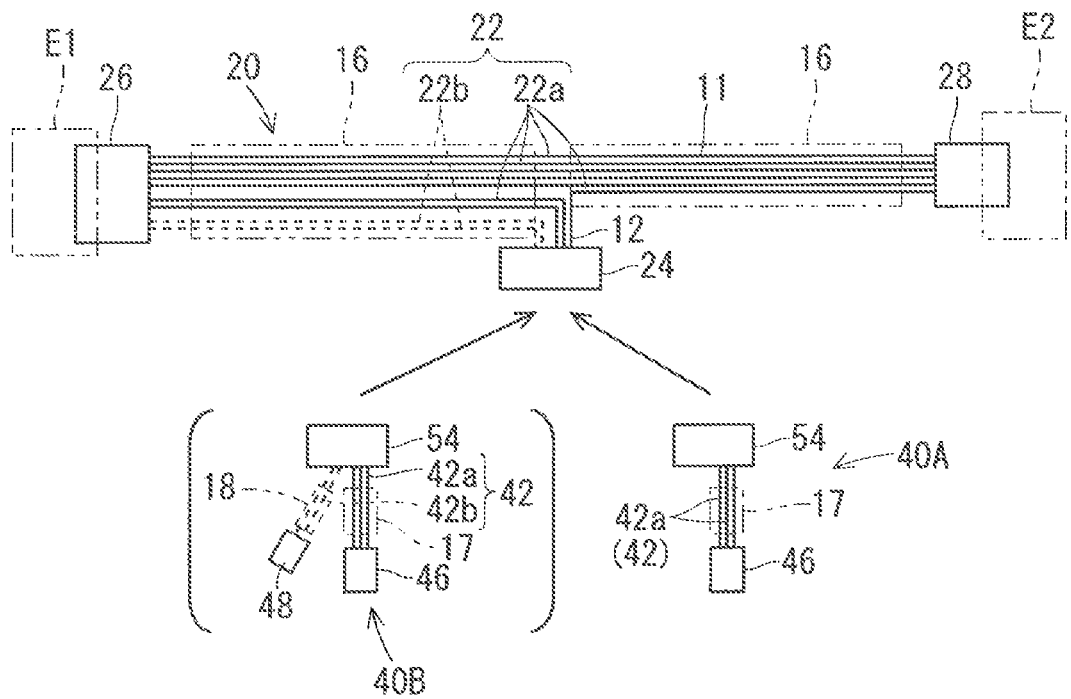
FIG. 3 An explanation diagram for describing a wire harness according to a first embodiment.
Figure 4:
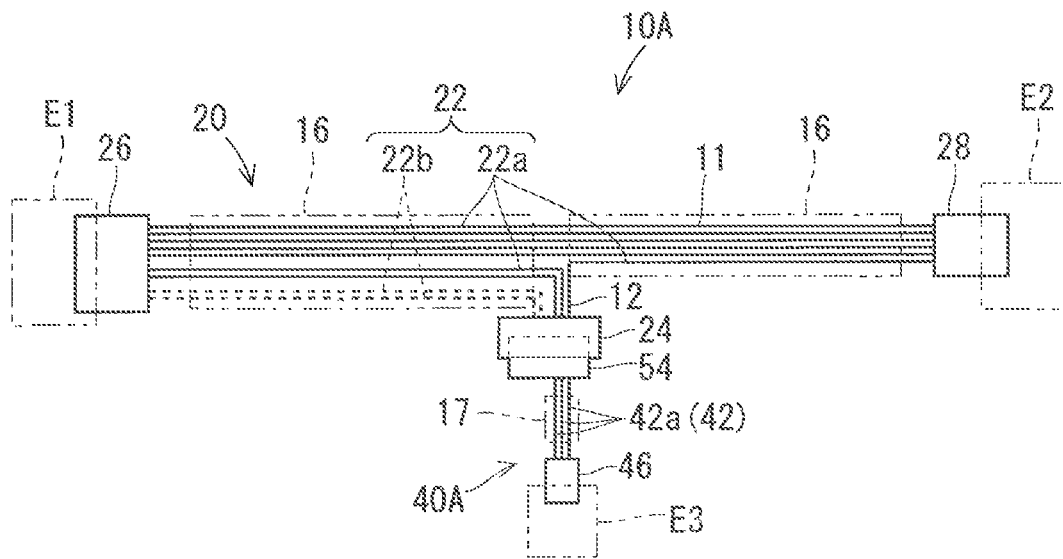
FIG. 4 A schematic view illustrating an example of the wire harness according to the first embodiment.
Figure 5:
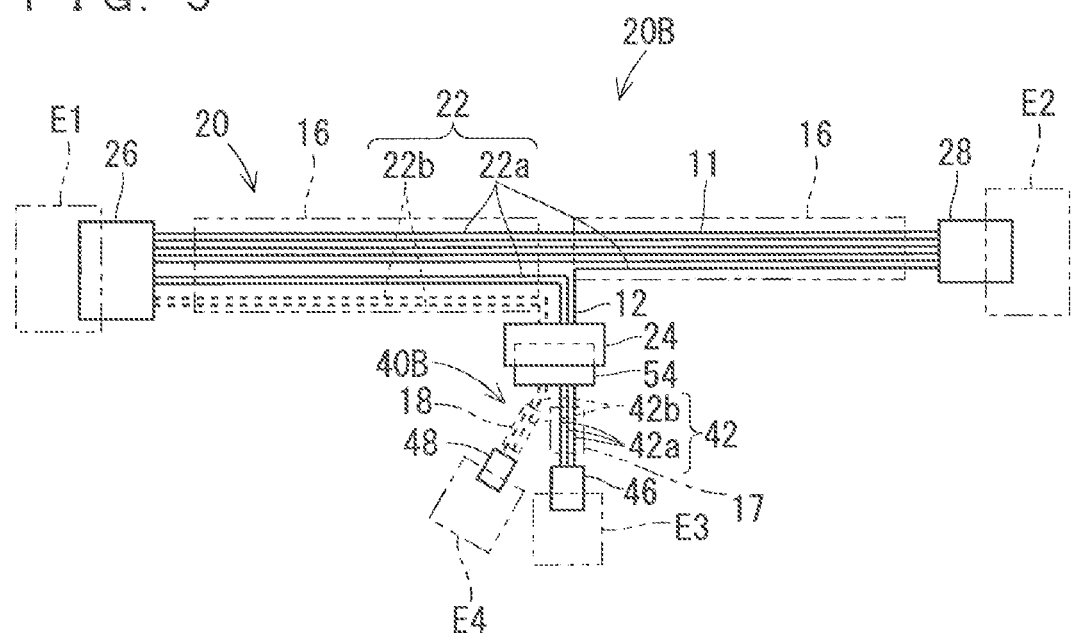
FIG. 5 A schematic view illustrating another example of the wire harness according to the first embodiment.

FIG. 3 is an explanation diagram for describing a wire harness 10A (or 10B) according to the first embodiment. FIG. 3 illustrates a plurality of second wiring members 40A and 40B selectively connected to a first wiring member 20. A configuration that the second wiring member 40A is connected to the first wiring member 20 is referred to as the wire harness 10A, and a configuration that the second wiring member 40B is connected to the first wiring member 20 is referred to as the wire harness 10B. FIG. 4 is a schematic view illustrating the wire harness 10A in which the second wiring member 40A is connected to the first wiring member 20. FIG. 5 is a schematic view illustrating the wire harness 10B in which the second wiring member 40B is connected to the first wiring member 20.

The wire harness 10A includes the first wiring member 20 and the second wiring member 40A. The wire harness 10B includes the first wiring member 20 and the second wiring member 409. In both the wire harnesses 10A and 10B, the first wiring member 20 is used in common and the second wiring members 40A and 40B are different.

The first wiring member 20 includes a plurality of first linear transmission members 22 and a first intermediate connector 24.

The first linear transmission member 22 needs to be a linear member transmitting electricity or light, for example. For example, the first linear transmission member 22 may be a general wire having a core wire and a covering around the cores wire, or may also be a bare lead wire, a shielded wire, a twist wire, an enamel wire, a nichrome wire, or an optical fiber, for example. The first linear transmission member 22 transmitting the electricity may be various kinds of signal lines or various kinds of power lines. The first linear transmission member 22 may be a single linear object or a composite object of a plurality of linear objects (a twisted wire and a cable made up of a plurality of linear objects covered by a sheath).

The first intermediate connector 24 is a member to which some of the plurality of first linear transmission members 22 are connected. The first intermediate connector 24 is a connector housing a plurality of terminals in one connector housing, for example. When the first linear transmission member 22 includes a linear member transmitting light (an optical fiber, for example), the first intermediate connector may include a structure of holding the linear member transmitting the light to be able to abut a linear member for transmitting light held by a connector on the other side. The first intermediate connector 24 is connected to a second intermediate connector 54 in the second wiring member 40A (or 40B), thus the first linear transmission member 22, which is connected to the first intermediate connector 24, in the plurality of first linear transmission members 22 can be electrically connected to at least one second linear transmission member 42a (42b) in the second wiring member 40A (or 40B).

Herein, the plurality of first linear transmission members 22 are gathered by being bundled in a state where a branch part 12 is branched halfway through a path of one main line 11. At least one first linear transmission members 22a of the plurality of first linear transmission members 22 serve as transmission paths for the electrical components E1, E2, and E3. At least the other one first linear transmission members 22b of the plurality of first linear transmission members 22 serve as transmission paths for connecting the electrical component E4 to the other electrical component (the electrical component E1 in FIG. 1). The first linear transmission member 22a and the first linear transmission member 22b are bundled together in the main line 11. At least one of first linear transmission members 22a and the first linear transmission members 22b are branched halfway through the main line 11 and lead out as the branch part 12. Herein, a length dimension of the branch part 12 is set equal to or smaller than 5 cm. The length dimension of the branch part 12 needs to be set to be equal to a length between a most protruded portion in the main line 11 around the branch part 12 and the first intermediate connector 24.

The first intermediate connector 24 described above is provided on at least one of one end portion of the main line 11, the other end portion of the main line 11, and an end portion of the branch part 12. Herein, the first intermediate connector 24 described above is connected to the end portion of the branch part 12. Thus, the plurality of first linear transmission members 22a and 22b, which are lead out as the branch part 12, of the plurality of first linear transmission members 22a and 22b are connected to the first intermediate connector 24 described above. Herein, a corrugated tube, a resin sheet, or an adhesive tape, for example, as a protection member 16 for protection is externally mounted on the main line 11.

Herein, terminal connectors 26 and 28 are connected to one end portion and the other end portion of the main line 11. The terminal connectors 26 and 28 are members to which an end portion of the first linear transmission members 22 is connected. The terminal connectors 26 and 28 are connectors housing a terminal in a connector housing, for example. When the first linear transmission member 22 includes a linear member transmitting light (an optical fiber, for example), the terminal connectors 26 and 28 may include a structure of holding the linear member transmitting the light to be able to abut a member to which a light signal is transmitted. The terminal connector 26 is connector-connected to a connector provided in the electrical component E1 and the terminal connector 28 is connector-connected to a connector provided in the electrical component E2.

The second wiring members 40A and 40B include at least one second linear transmission member 42 and a second intermediate connector 54.

The second linear transmission member 42 needs to be a linear member transmitting electricity or light, for example. An example applicable as the second linear transmission member 42 is similar to that of first linear transmission member 22, thus the description is omitted. Herein, the second wiring member 40A includes at least one second linear transmission member 42a connected to the electrical component E3 as the second linear transmission member 42. The second wiring member 40B includes at least one second linear transmission member 42a connected to the electrical component E3 and at least one second linear transmission member 42*b* connected to the electrical component E4 as the second linear transmission member 42. In the second wiring member 40B, base end side portions of the second linear transmission members 42*a* and 42*b* (portions on a side of the second intermediate connector 54) are bundled together, and tip end side portions of the second linear transmission members 42*a* and 42*b* (portions on a side of the terminal connectors 46 and 48) are branched halfway through.

Herein, the terminal connector 46 is connected to an end portion of the second linear transmission member 42*a* in the second wiring member 40A. The terminal connector 46 has a configuration similar to the terminal connector 26 except for the member to which the terminal connector is connected. The terminal connector 46 is connector-connected to a connector provided in the electrical component E3. A corrugated tube, a resin sheet, or an adhesive tape, for example, as a protection member 17 for protection is externally mounted on the second linear transmission member 42*a*.

The terminal connector 46 is connected to the end portion of the second linear transmission member 42*a* in the second wiring member 40B. The terminal connector 48 is connected to an end portion of the second linear transmission member 42*b*. The terminal connector 48 has a configuration similar to the terminal connector 26 except for the member to which the terminal connector is connected. The terminal connector 48 is connector-connected to a connector provided in the electrical component E4. A corrugated tube, a resin sheet, or an adhesive tape, for example, as protection members 17 and 18 for protection is externally mounted on the second linear transmission members 42*a*, and 42*b*.

The second intermediate connector 54 is a member to which at least one second linear transmission member 42 is connected. The second intermediate connector 54 has a configuration similar to the first intermediate connector 24 except for the member to which the intermediate connector is connected. The second intermediate connector 54 is configured to be able to be connected to the first intermediate connector 24.

The first intermediate connector 24 includes terminals corresponding to both the plurality of first linear transmission members 22*a* and 22*b* connected to the second intermediate connector 54. The second intermediate connector 54 can be connected to the first intermediate connector 24 and has a connector housing structure capable of housing terminals corresponding to both the plurality of second linear transmission members 42*a* and 42*b*. Thus, the housing structure can be used in common in the second intermediate connector 54 in both the second wiring members 40A and 40B.

The second linear transmission member 42*a* is connected to the second intermediate connector 54 in the second wiring member 40A. The second wiring member 40A does not include the second linear transmission member 42*b*, thus a cavity housing the terminal corresponding to the second linear transmission member 42*b* in the second intermediate connector 54 is empty. It is also applicable that the terminal corresponding to the second linear transmission member 42*b* in the second intermediate connector 54 is not connected to the linear transmission member but is housed in the cavity.

Thus, in the wire harness 10A, the first intermediate connector 24 and the second intermediate connector 54 are connected, thus the first linear transmission members 22*a*, which are at least one of the plurality of first linear transmission members 22*a* and 22*b* connected to the first intermediate connector 24, of the plurality of first linear transmission members 22 are connected to at least one second linear transmission member 42*a*. In this case, the first linear transmission members 22*b* which are at least one of the plurality of first linear transmission members 22*a* and 22*b*, which are connected to the first intermediate connector 24, of the plurality of first linear transmission members 22 are connected only to the first intermediate connector 24, and is not connected to the second linear transmission member in the second wiring member 40A.

In contrast, the second linear transmission member 42*a* and the second linear transmission member 42*b* are connected to the second intermediate connector 54 in the second wiring member 40B. That is to say, the plurality of terminals connected to the second linear transmission members 42*a* and 42*b* in the second intermediate connector 54 are housed in the cavity. The second intermediate connector 54 having the same configuration can be used for the second wiring members 40A and 40B. Thus, in the wire harness 10B, the first intermediate connector 24 and the second intermediate connector 54 are connected, thus the plurality of first linear transmission members 22*a* and 22*b*, which are connected to the first intermediate connector 24, of the plurality of first linear transmission members 22 are connected to the second linear transmission members 42*a* and 42*b*.

That is to say, the second wiring member 40A can be considered as a partial connection type member including the second linear transmission member 42 connected only to at least one of the plurality of first linear transmission members 22 connected to the first intermediate connector 24. The wire harness 10A can be considered to include the second wiring member 40A of partial connection type.

The second wiring member 40B can be considered as an entire connection type member including the second linear transmission member 42 connected to all the plurality of first linear transmission members 22 connected to the first intermediate connector 24. The wire harness 10B can be considered to include only the entire connection type member as the second wiring member 40A.

The first wiring member 20 includes the first linear transmission members 22*a* and 22*b* for all the electrical components E1, E2, E3, and E4 having a possibility of connection in the plurality of specifications (the specification that the electrical components E1, E2, and E3 are included and the electrical component E4 is not included and the specification that the electrical components E1, E2, E3, and E4 are included).

In manufacturing the wire harnesses 10A and 10B in which the plurality of specifications are taken into consideration, prepared is the first wiring member 20 which includes the plurality of first linear transmission members 22*a* and 22*b* and the first intermediate connector 24, some of the plurality of first linear transmission members 22*a* and 22*b* being connected to the first intermediate connector 24 (refer to FIG. 3, Step (a)).

Also prepared are the second wiring members 40A and 40B including at least one second linear transmission member 42 and the second intermediate connector 54 to which at least one second linear transmission member 42 is connected. Prepared as the second wiring members 40A and 40B are a plural types of members having different combinations of connection between the plurality of first linear transmission members 22*a* and 22*b* connected to the first intermediate connector 24 and at least one of the second linear transmission members 42*a* and 42*b* in the state where the second intermediate connector 54 is connected to the first intermediate connector 24. Herein, the first linear transmission member 22*a* and the second linear transmission member 42*a* are connected in the second wiring member 40A, and the first linear transmission members 22a and 22b and the second linear transmission members 42a and 42b are connected in the second wiring member 40B (refer to FIG. 3, Step (b)).

Subsequently, one of the plural types of second wiring members 40A and 40B is selected, and the second intermediate connector 54 and the first intermediate connector 24 are connected (refer to FIG. 4 and FIG. 5, Step (c)). When the second wiring member 40A is selected, as illustrated in FIG. 4, the terminal connectors 26 and 28 can be connector-connected to the electrical components E1 and E2, and the terminal connector 46 can be connected to the electrical component E3. When the second wiring member 40B is selected, as illustrated in FIG. 4, the terminal connectors 26 and 28 can be connector-connected to the electrical components E1 and E2, and the terminal connectors 46 and 48 can be connected to the electrical components E3 and E4.

According to the present embodiment, at least one part member of plurality of first linear transmission members 22a, which are connected to the first intermediate connector 24, of the plurality of first linear transmission members 22 can be connected to the electrical component E3 via at least one second linear transmission member 42a. Thus, a redundant circuit and a redundant terminal connector in the second wiring member 40A can be reduced as much as possible in the specification that at least one part member of the plurality of first linear transmission members 22a and 22b connected to the first intermediate connector 24 (the first linear transmission members 22a) are connected to the electrical component E3 and the remaining members (the first linear transmission members 22b) are not connected to the electrical component E4.

When the combination of connection between the plurality of first linear transmission members 22 connected to the first intermediate connector 24 and at least one second linear transmission member 42 is changed or the linear transmission member 42b is added in the second wiring member 40A, the first linear transmission member 22b which is not connected to the electrical component E4 in one specification can be connected to the other electrical component E4 in the other specification. In this case, the first wiring member 20 is communalized to the plurality of specifications. The second wiring members 40A and 40B are designed and manufactured in accordance with the plurality of specifications, however, they become small in scale, thus can easily correspond to the difference in the specifications. Thus, the second wiring members 40A and 40B can easily correspond to the difference in the specifications of automobiles while enabling a reduction in a redundant circuit and a redundant terminal connector as much as possible.

Particularly, the first wiring member 20 includes the larger number of linear transmission members than the second wiring members 40A and 40B, so that it is difficult to design and manufacture the first wiring member 20. Thus, it is difficult to design and manufacture the first wiring member 20 in accordance with a plurality of specifications. In contrast, the second wiring members 40A and 40B can be configured more simply than the first wiring member 20, thus it is relatively easy to design and manufacture the second wiring members 40A and 40B even when there are a plurality of specifications. Also from this point, the second wiring members 40A and 40B can easily correspond to the difference in the specifications of automobiles.

The protection members 17 and 18 and a clamp component as a component for fixing a vehicle, for example, may be attached near the terminals of the wire harnesses 10A and 10B in addition to the terminal connectors 46 and 48. As described above, provided is the difference in the specifications on the side of the second wiring members 40A and 40B in the side of the terminals in the wire harnesses 10A and 10B, thus the component provided near the terminal can be reduced in accordance with the specification, and a merit increases.

In the first wiring member 20, the plurality of first linear transmission members 22 are gathered in the state where the branch part 12 is branched from the main line 11, and the first intermediate connector 24 is provided on the end portion of the branch part 12. Herein, the main line 11 includes a portion where the largest, number of first linear transmission members 22 are bundled. Thus, the main line 11 including the largest number of first linear transmission members 22 can be used in common in the plurality of specifications. Thus, the review of the number of design processes corresponding to the difference in the specifications needs not be frequently performed, and it is easy to correspond to the difference in the specifications of the automobiles.

The first intermediate connector 24 may be provided on at least one of one end portion of the main line 11, the other end portion of the main line 11, and the end portion of the branch part 12.

When the length of the branch part 12 is equal to or smaller than 5 cm, the first linear transmission member 22 disposed along the branch part 12 hardly tangles or the tangle can be easily resolved in bundling the first wiring member 20. Thus, need to take the tangle of first linear transmission member 22 into consideration decreases in designing and manufacturing the first wiring member 20, and the first wiring member 20 can be designed and manufactured more easily.

The first wiring member 20 includes the plurality of first linear transmission members 22 for all the electrical components E1, E2, E3, and E4 having the possibility of connection in the plurality of specifications, thus the first wiring member 20 can be communalized to all the plurality of specifications.

Second Embodiment

A wire harness and a method of manufacturing the wire harness according to a second embodiment are described.

An example of a wire harness 700 in an automobile is described with reference to FIG. 6 for explanatory convenience. The wire harness 700 includes a large number of linear transmission members 710 so as to be applicable to any specification in consideration of a case where there is a possibility that a plurality of specifications are adopted in the automobile.

Herein, the wire harness 700 includes a common linear transmission member 711 and optional linear transmission members 712a, 712b, 712c, 712d, and 712e as the plurality of linear transmission members 710. The plurality of linear transmission members 710 are bundled in a state where at least one (two herein) branch parts 702 and 703 are branched from the main line 701. A terminal connector 720 is connected to both end portions of the main line 701 and each end portion of the branch parts 702 and 703. In FIG. 6, the terminal connector 720 is connected to each of the common linear transmission member 711 and the optional linear transmission members 712a, 712b, 712c, 712d, and 712e. The terminal connector 720 is a connector connected to an electrical component. The electrical component is an electrical component mounted to each unit in an automobile in the manner similar to the first embodiment.

The common linear transmission member 711 is used in common for a plurality of specifications. Each of the optional linear transmission members 712a, 712b, 712c, 712d, and 712e is used or not used depending on a specification. The number of combinations of presence or absence of each of the optional linear transmission members 712a, 712b, 712c, 712d, and 712e is calculated to be 2×2×2×2× 2=32. Thus, the wire harnesses having 32 part numbers need to be manufactured separately to correspond to the difference in the plurality of specifications.

As described in the first embodiment, when the wire harness 700 is applied in common to the plurality of specifications, a large number of redundant optional linear transmission members 712a, 712b, 712c, 712d, and 712e and a redundant terminal connector 720 occur. When the wire harness 700 is manufactured separately in accordance with each specification, it takes an immense amount of work to design and manufacture the wire harness 700 for each part number. The wire harness according to the present embodiment relates to a technique capable of easily corresponding to a difference in specifications of automobiles while enabling a reduction in a redundant circuit and a redundant terminal connector as much as possible.

Figure 7:
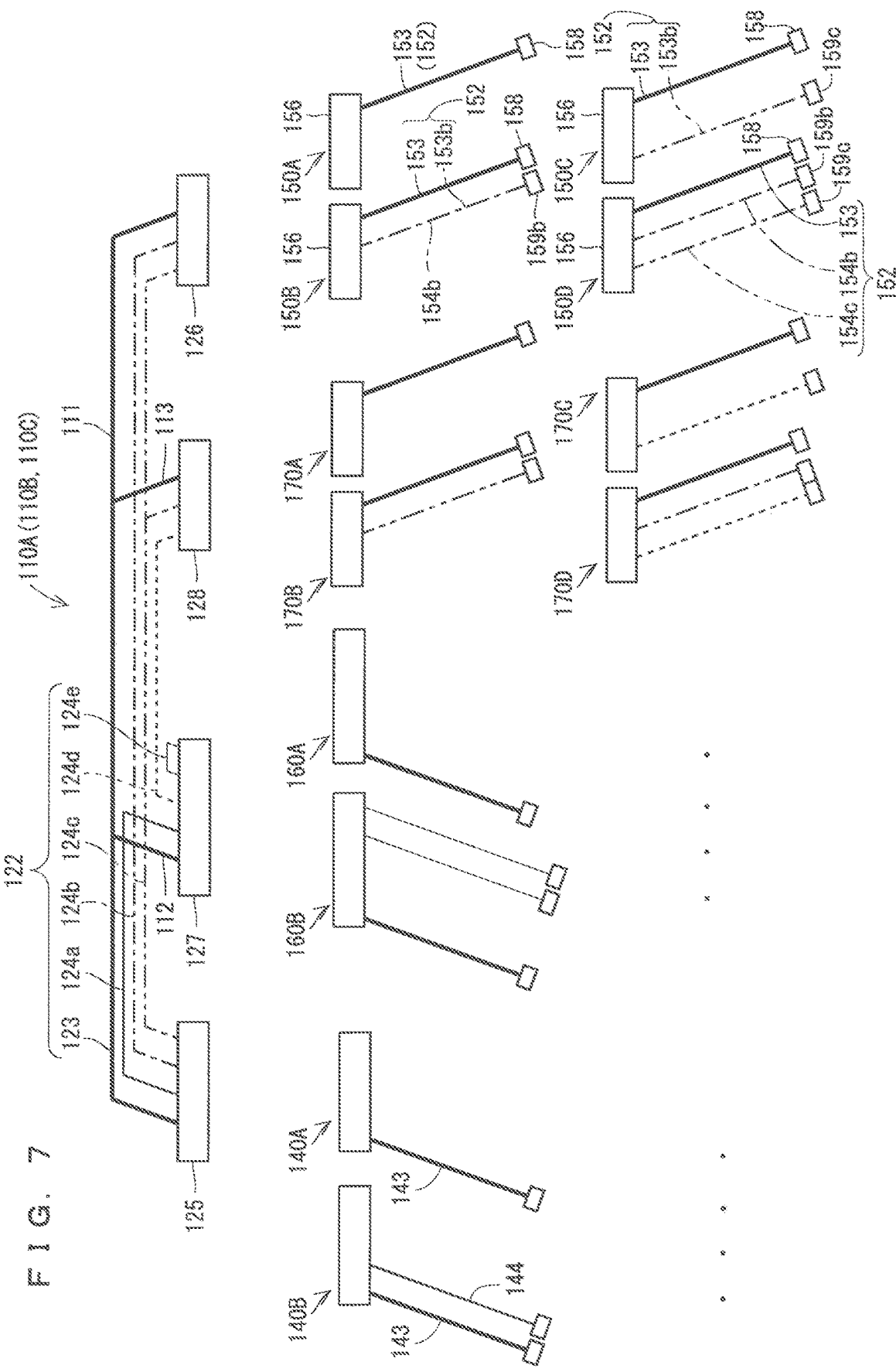
FIG. 7 An explanation diagram for describing a wire harness according to a second embodiment.
Figure 8:
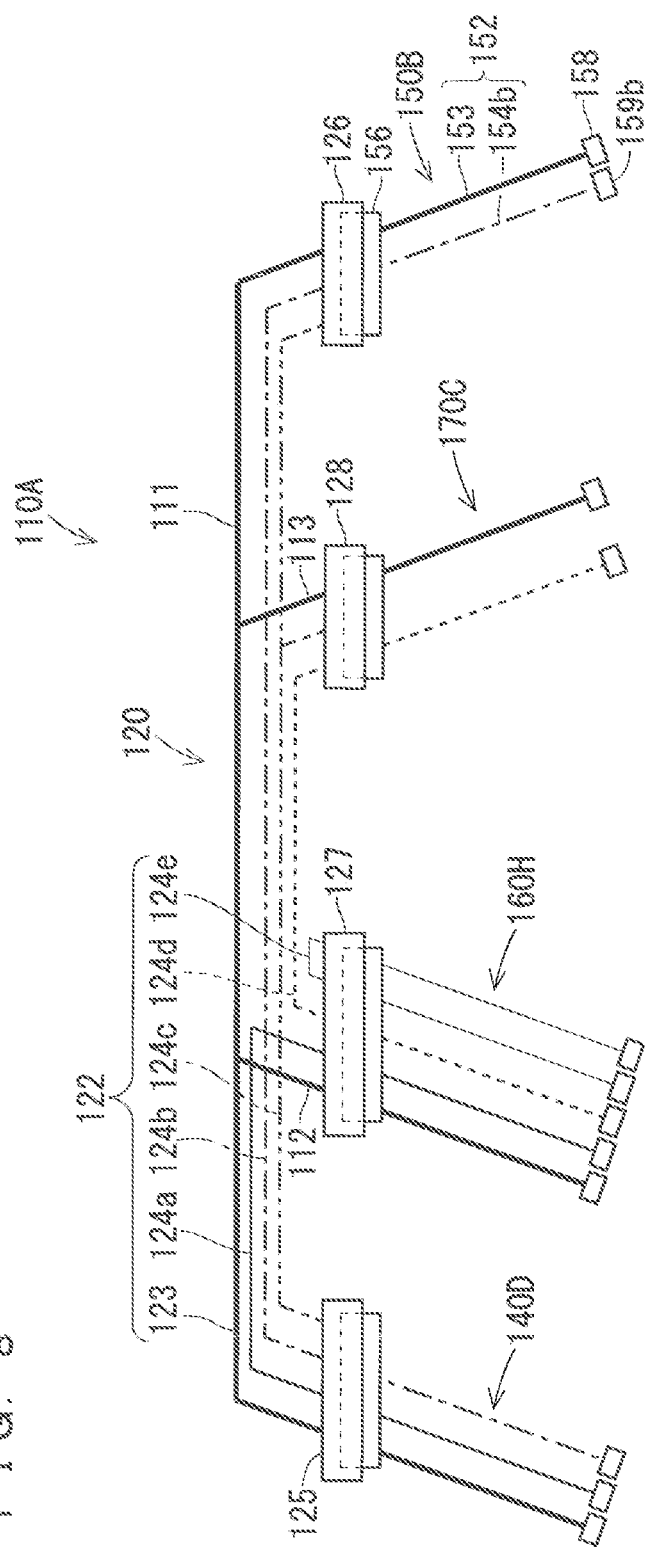
FIG. 8 A schematic view illustrating an example of the wire harness according to the second embodiment.
Figure 9:
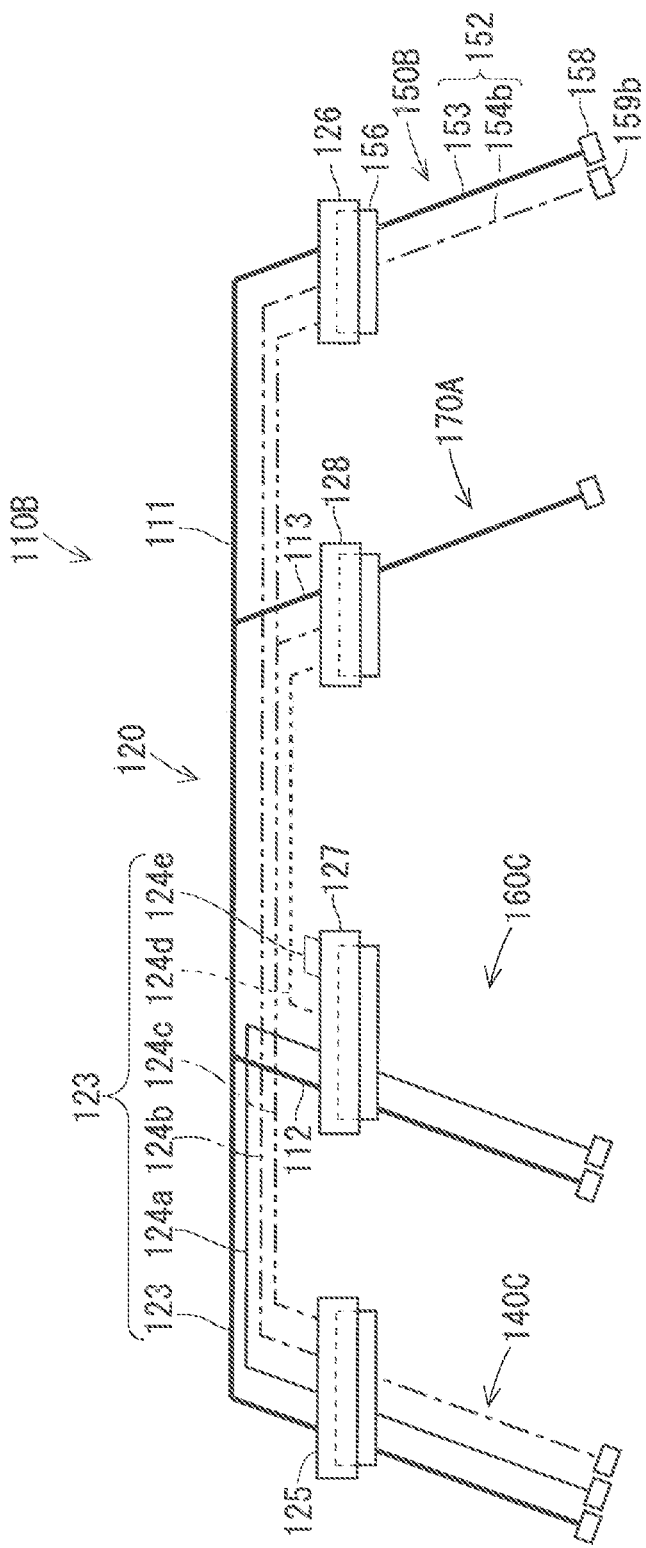
FIG. 9 A schematic view illustrating another example of the wire harness according to the second embodiment.
Figure 10:
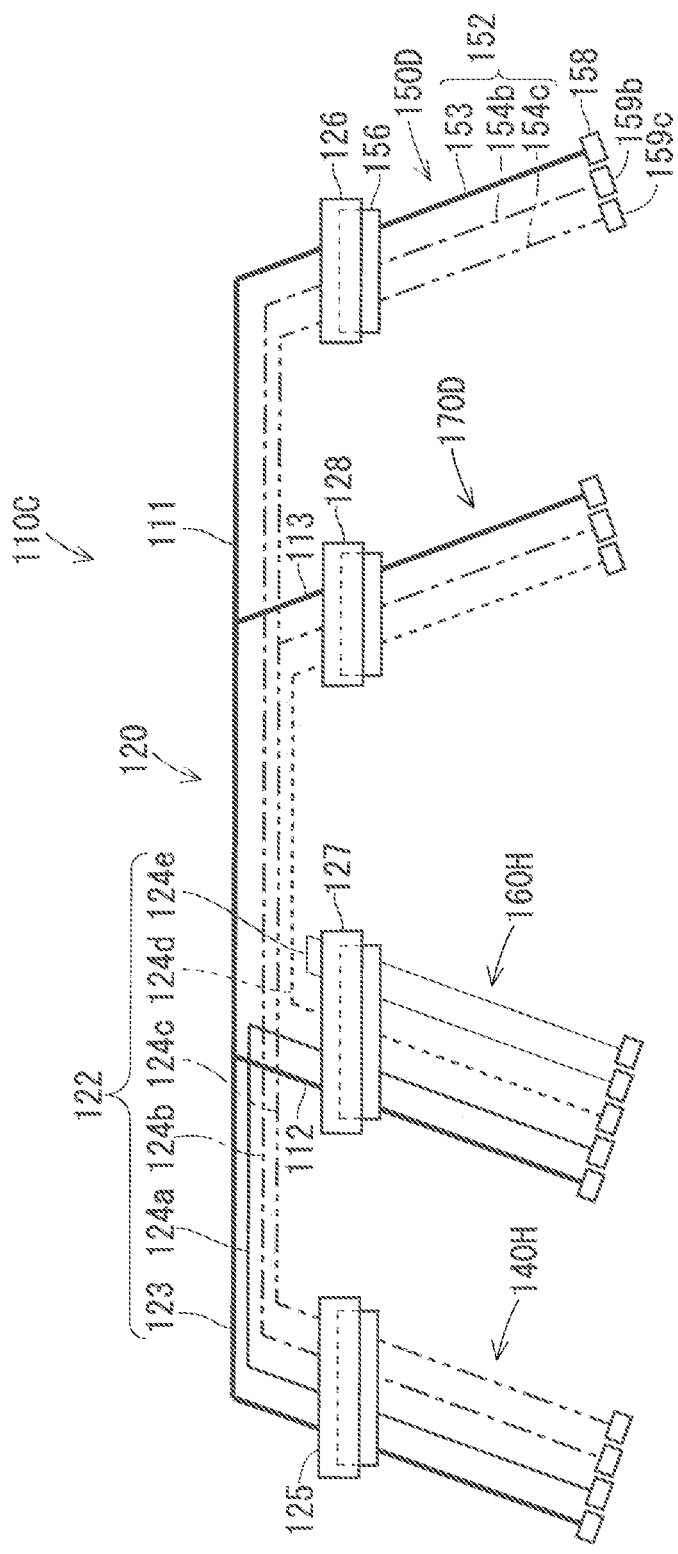
FIG. 10 A schematic view illustrating still another example of the wire harness according to the second embodiment.

FIG. 7 is a schematic view illustrating a wire harness 110A (or 110B, 110C) according to the second embodiment. FIG. 7 illustrates the second wiring member selectively connected to first intermediate connectors 125, 126, 127, and 128 in a first wiring member 120. FIG. 8 is a schematic view illustrating the wire harness 110A according to an example, FIG. 9 is a schematic view illustrating the wire harness 110B according to another example, and FIG. 10 is a schematic view illustrating the wire harness 110C according to still another example.

The wire harness 110A (or 110B, 110C) includes the first wiring member 120, one of second wiring members 140A, 140B, . . . , one of second wiring members 150A, 150B, 150C, and 150D, one of second wiring members 160A, 160B, . . . , and one of second wiring members 170A, 170B, 170C, and 170D. That is to say, the first wiring member 120 is used in common in the wire harnesses 110A, 110B, and 110C. In the wire harnesses 110A, 110B, and 110C, the second wiring members 140A, 140B, . . . , the second wiring members 150A, 150B, 150C, and 150D, the second wiring members 160A, 160B, . . . , and the second wiring members 170A, 170B, 170C, and 170D are used in accordance with the specification.

The first wiring member 120 includes a plurality of first linear transmission members 122 and the first intermediate connectors 125, 126, 127, and 128.

The first linear transmission member 122 needs to be a linear member transmitting electricity or light, for example, in the manner similar to the first linear transmission member 22 described above.

The first intermediate connectors 125, 126, 127, and 128 are members to which some of the plurality of first linear transmission members 122 are connected. The first intermediate connectors 125, 126, 127, and 128 are connectors housing a plurality of terminals in one connector housing, for example, in the manner similar to the first intermediate connector 24 described above. The first intermediate connectors 125, 126, 127, and 128 may include a structure of holding the linear member transmitting the light to be able to abut a linear member for transmitting light held by a connector on the other side. When the first intermediate connector 125 is connected to the second intermediate connector in one of the second wiring members 140A, 140B, . . . , for example, the first linear transmission member 122, which is connected to the first intermediate connector 125, of the plurality of first linear transmission members 122 can be electrically connected to at least one second linear transmission member in the second wiring members 140A, 140B . . . . In the similar manner, the first intermediate connectors 126, 127, and 128 can be connected to a second intermediate connector 156 in one of the second wiring members 150A, 150B, 150C, and 150D, a second intermediate connector in one of the second wiring members 160A, 160B, . . . , and a second intermediate connector in one of the second wiring members 170A, 170B, 170C, and 170D.

Herein, the plurality of first linear transmission members 122 are gathered by being bundled in a state where branch parts 112 and 113 are branched halfway through a path of one main line 111. The plurality of first linear transmission members 122 include a first linear transmission member 123 and first linear transmission members 124a, 124b, 124c, 124d, and 124e. The first linear transmission member 123 is used in common for a plurality of specifications. That is to say, the first linear transmission member 123 serves as a transmission path for an electrical component mounted in common for a plurality of specifications. Each of the first linear transmission members 124a, 124b, 124c, 124d, and 124e is used or not used depending on a specification. That is to say, each of the first linear transmission members 124a, 124b, 124c, 124d, and 124e serves as a transmission path far an electrical component which is mounted or not mounted depending on a specification. The first linear transmission member 123 and the first linear transmission members 124a, 124b, 124c, 124d, and 124e are bundled together in the main line 111. In each drawing, each of the first linear transmission member 123 and the first linear transmission members 124a, 124b, 124c, 124d, and 124e is illustrated as one line, however, there may be a case where it is a bundled body made up of the plurality of linear transmission members.

At least some of the first linear transmission member 123 and the first linear transmission members 124a, 124b, 124c, 124d, and 124e reach both end portions of the main line 111. Herein, the first linear transmission members 123, 124a, 124b, and 124c reach one end portion of the main line 111, and the first intermediate connector 125 is connected to end portions of the first linear transmission members 123, 124a, 124b, and 124c. The first linear transmission members 123, 124b, and 124c reach the other end portion of the main line 111, and the first intermediate connector 126 is connected to end portions of the first linear transmission members 123, 124b, and 124c.

The first linear transmission members 123, 124a, 124d, and 124e are branched in the branch part 112 halfway through the main line 111, and the first intermediate connector 127 is connected to end portions of the first linear transmission members 123, 124a, 124d, and 124e. In the first linear transmission member 124e, a middle portion in an extension direction is bundled into the main line 111, and both end portions extend along the branch part 112. The first linear transmission members 123, 124c, and 124d are branched in the branch part 113 halfway through the main line 111, and the first intermediate connector 127 is connected to enol portions of the first linear transmission members 123, 124c, and 124d.

Some of the plurality of first linear transmission members 122 are connected to the first intermediate connectors 125, 126, 127, and 128, respectively. A length dimension of each of the branch parts 112 and 113 is set equal to or smaller than 5 cm in the manner similar to the first embodiment.

The present embodiment describes an example that the first intermediate connectors 125, 126, 127, and 128 are provided on at least one of one end portion of the main line 111, the other end portion of the main line 111, the branch part 112, and the branch part 113. The present embodiment also describes an example that the first wiring member 120 includes the plurality of first intermediate connectors 125, 126, 127, and 128. The present embodiment further describes an example that the first intermediate connectors 125, 126, 127, and 128 are provided on the one end portion and the other end portion of the main line 111 and the branch parts 112 and 113, respectively.

A corrugated tube, a resin sheet, or an adhesive tape, for example, as a protection member for protection may be externally mounted on the main line 111 and the branch parts 112 and 113.

The second wiring members 150A, 150B, 150C, and 150D connected to the first intermediate connector 126 are mainly described as the second wiring member.

The second wiring members 150A, 150B, 150C, and 150D include at least one second linear transmission member 152 and the second intermediate connector 156.

The second linear transmission member 152 needs to be a linear member transmitting electricity or light, for example, in the manner similar to the first linear transmission member 22 described above. The second wiring members 150A, 150B, 150C, and 150D include the second linear transmission member 152 which is different depending on the difference in the specifications. All of the second wiring members 150A, 150B, 150C, and 150D corresponding to each specification include at least one second linear transmission member 153 corresponding to the first linear transmission member 123. The second wiring members 150A, 150B, 150C, and 150D include or do not include the second linear transmission member corresponding to the first linear transmission members 124b and 124c (they are connected to the first intermediate connector 125) depending on the specification. Used is the second linear transmission member 152 corresponding to a combination of the second linear transmission member which may occur in accordance with the difference in the specifications in a member to which the second intermediate connector 156 is connected.

FIG. 7 illustrates an example that the second wiring member 150A includes at least one second linear transmission member 153 connected to the first linear transmission member 123, and does not include the second linear transmission member connected to the first linear transmission members 124b and 124c. The second wiring member 150B includes at least one second linear transmission member 153 connected to the first linear transmission member 123 and the second linear transmission member 154b connected to the first linear transmission member 124b, and does not include the second linear transmission member connected to the other first linear transmission member 124c. The second wiring member 150C includes at least one second linear transmission member 153 connected to the first linear transmission member 123 and the second linear transmission member 154c connected to the first linear transmission member 124c, and does not include the second linear transmission member connected to the other first linear transmission member 124b. The second wiring member 150D includes at least one second linear transmission member 153 connected to the first linear transmission member 123 and the second linear transmission members 154b and 154c connected to the first linear transmission members 124b and 124c.

The second wiring members 150A, 150B, and 150C can be considered as partial connection type members including the second linear transmission member 152 connected to at least one of the plurality of first linear transmission members 122 connected to the first intermediate connector 126. The second wiring member 150D can be considered as an entire connection type member including the second linear transmission member 152 connected to all the plurality of first linear transmission members 122 connected to the first intermediate connector 126.

The partial connection type member and the entire connection type member can also be selectively connected to the other first intermediate connectors 125, 127, and 128. The wire harnesses 110A and 110B can be considered to include the second wiring members 150A, 150B, and 150C of partial connection type. The wire harness 110C can be considered to include only the second wiring members 140H, 150D, 160H, and 170H of entire connection type.

In the second wiring members 150A, 150B, and 150C, base end side portions (portions on a side of the second intermediate connector) are bundled together, and tip end side portions (portions on a side of the terminal connector) are branched halfway through.

Herein, a terminal connector 158 is connected to an end portion of the second linear transmission member 153 in the second wiring member 150A. When the second wiring members 150B, 150C, and 150D include the second linear transmission members 154b and 154c, terminal connectors 159b and 159c are connected to end portions of the second linear transmission members 154b and 154c, respectively. The terminal connectors 158, 159b, and 159c have a configuration similar to the terminal connector 26 in the first embodiment except for the member to which the terminal connectors are connected. The terminal connectors 158, 159b, and 159c are separately connector-connected to connectors each provided in an electrical component. A corrugated tube, a resin sheet, or an adhesive tape, for example, as a protection member for protection may be externally mounted on the second linear transmission members 153, 154b, and 154c.

The second intermediate connector 156 is a member to which at least one second linear transmission member 152 is connected. The second intermediate connector 156 has a configuration similar to the first intermediate connector 126 except for the member to which the intermediate connector is connected. The second intermediate connector 156 is configured to be able to be connected to the first intermediate connector 126.

A relationship between the first linear transmission member 122 and the first intermediate connector 126 and a relationship between the second linear transmission member 152 and the second intermediate connector 156 are similar to the relationship between the first linear transmission member 22 and the first intermediate connector 24 and the relationship between the second linear transmission member 42 and the second intermediate connector 54 described in the first embodiment described above. Thus, the first intermediate connector 126 includes the terminals corresponding to all the first linear transmission members 123, 124b, and 124c connected to the first intermediate connector 126 regardless of the difference in the specifications. The second intermediate connector 156 can be connected to the first intermediate connector 126 and has a connector housing structure capable of housing terminals corresponding to all the second linear transmission members 153, 154b, and 154c. Thus, the housing structure can be used in common as the second intermediate connector 156 in all the second wiring members 150A, 150B, 150C, and 150D.

The second linear transmission member 153 is connected to the second intermediate connector 156 in the second wiring member 150A. In the second intermediate connector 156, a cavity corresponding to the second linear transmission members 154b and 154c is empty or houses a terminal which is not connected to the linear transmission member.

Thus, when the second intermediate connector 156 in the second wiring member 150A is connected to the first intermediate connector 126, the first linear transmission members 123, which are at least one of the plurality of first linear transmission members 123, 124b, and 124c (connected to the first intermediate connector 126) are connected to the second linear transmission member 153. In this case, the other first linear transmission members 124b and 124c are connected only to the first intermediate connector 24, and are not connected to the second linear transmission member in the second wiring member 150A.

Assumed is an application of the second wiring members 150B, 150C, and 150D in which at least one of the second linear transmission members 154b and 154c is added to the second wiring member 150A in place of the second wiring member 150A. In this case, when the second intermediate connector 156 in the second wiring members 150B, 150C, and 150D is connected to the first intermediate connector 126, the first linear transmission member 123 is connected to the second linear transmission member 153. In addition, at least one of the other first linear transmission members 124b and 124c is also connected to the second linear transmission members 154b and 154c.

In the similar manner, prepared are the second wiring members 140A, 140B, . . . connected to the first intermediate connector 125, the second wiring members 160A and 160 connected to the first intermediate connector 127, and the second wiring members 170A, 170B, 170C, and 170D connected to the first intermediate connector 128 of types (part numbers) in which the combination of the second linear transmission member is changed in accordance with the difference in the specifications.

The first wiring member 120 includes the first linear transmission member 122 in which all the specifications described above are taken into consideration, thus the first wiring member 120 includes the first linear transmission member 122 for all electrical components having a possibility of connection.

Figure 6:
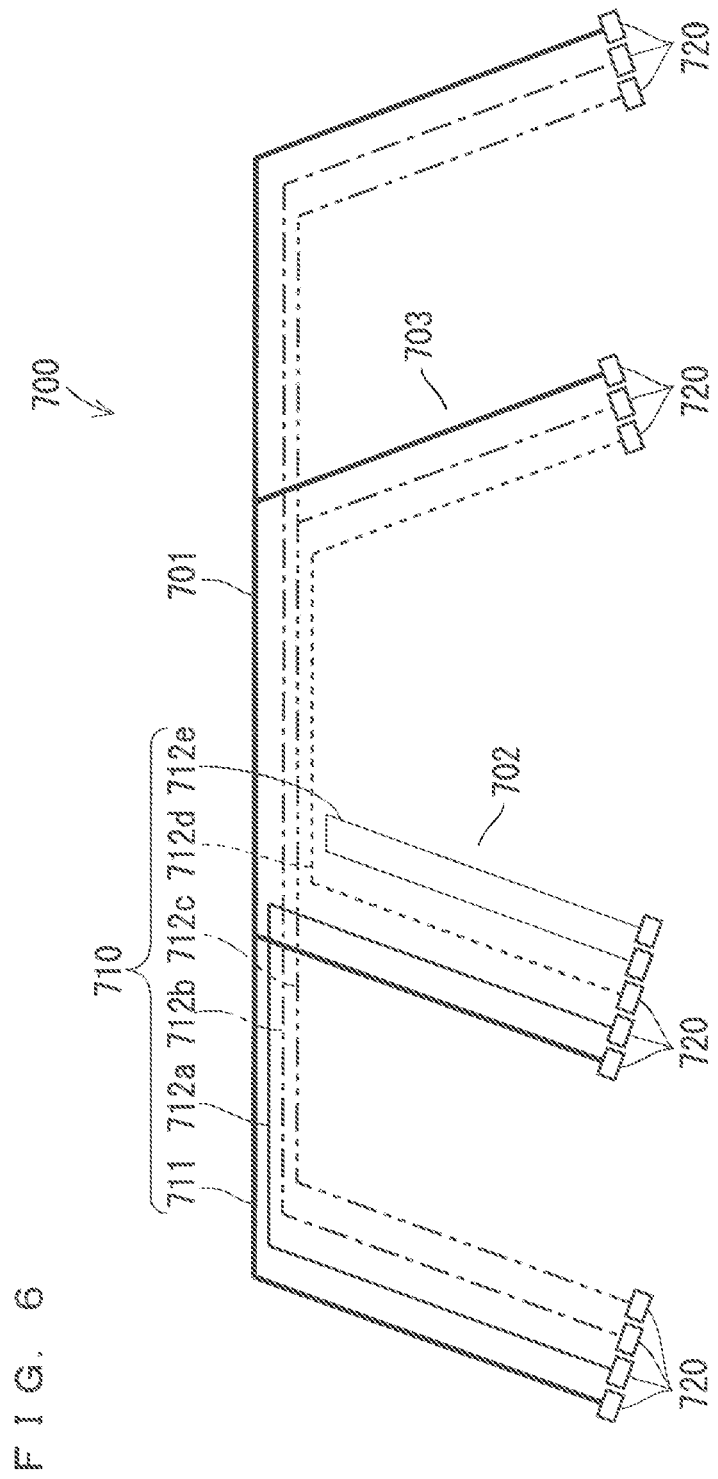
FIG. 6 A schematic view illustrating an example of a wire harness.

The first wiring member 120 described above is prepared in manufacturing the wire harness in which the plurality of specifications are taken into consideration (refer to FIG. 6, Step (a)).

The second wiring members 140A, 140B, . . . , the second wiring members 150A, 150B, 150C, and 150D, the second wiring, members 160A, 160B, . . . , and the second wiring members 170A, 170B, 170C, and 170D are prepared in consideration of the difference in each specification for each of the first intermediate connectors 125, 126, 127, and 128 in the first wiring member 120 (refer to FIG. 7, Step (b)).

Subsequently, one of the second wiring members 140A, 140B, . . . , one of the second wiring members 150A, 150B, 150C, and 150D, one of the second wiring members 160A, 160B, . . . , and one of the second wiring members 170A, 170B, 170C, and 170D are selected and connected to the first intermediate connectors 125, 126, 127, and 128, respectively (refer to FIG. 7 to FIG. 9, Step (c)).

When assumed is a specification that the common linear transmission member 711 and the optional linear transmission members 712a, 712b, 712d, and 712e are needed in FIG. 6, the wire harness 110A illustrated in FIG. 8 can be manufactured by selecting the second wiring member in accordance with the specification (in FIG. 8, the second wiring members 140D, 150B, 160H, and 170C are selected).

In this case, the first intermediate connectors 125, 126, and 128 have a configuration that at least one of the first linear transmission members 122 connected to the first intermediate connectors 125, 126, and 128 are connected to the second linear transmission member, and the remaining members are not connected to the second linear transmission member.

When assumed is a specification that the common linear transmission member 711 and the optional linear transmission members 712a and 712b are needed in FIG. 6, the wire harness 110B illustrated in FIG. 9 can be manufactured by selecting the second wiring member in accordance with the specification (in FIG. 9 the second wiring members 140C, 150B, 160C, and 170A are selected). In this case, the first intermediate connectors 125, 126, 127, and 128 have a configuration that at least one of the first linear transmission members 122 connected to the first intermediate connectors 125, 126, 127, and 128 are connected to the second linear transmission member, and the remaining members are not connected to the second linear transmission member.

When assumed is a specification that the common linear transmission member 711 and the optional linear transmission members 712a and 712b, 712c, 712d, and 712e are needed in FIG. 6, the wire harness 110C illustrated in FIG. 10 can be manufactured by selecting the second wiring member in accordance with the specification (in FIG. 10, the second wiring members 140H, 150D, 170D, and 160H are selected). In this case, in the first intermediate connectors 125, 126, 127, and 128, all the first linear transmission members 122 connected to the first intermediate connectors 125, 126, 127, and 128 are connected to the second linear transmission member.

According to the present embodiment, a function effect similar to that described in the above first embodiment can be obtained.

Particularly, the first wiring member 120 includes the large number of electrical wires, is routed over a long distance, and is branched in a large number of positions compared to the second wiring member. Thus, it is more difficult to design and manufacture the first wiring member 20. Such a first wiring member 120 can be communalized to the plurality of specifications, and can be designed and manufactured easily.

The plurality of first intermediate connectors 125, 126, 127, and 128 are provided, and the second wiring members 140A, 140B, . . . , the second wiring members 150A, 150B, 150C, and 150D, the second wiring members 160A, 160B, . . . , and the second wiring members 170A, 170B, 170C, and 170D are selectively connected thereto, respectively. Herein, the first intermediate connectors 125, 126, 127, and 128 are provided on the both end portions of the main line 111 and all the end portions of the branch parts 112 and 113. Thus, each of the plurality of second wiring members 140A, 140B, . . . , second wiring members 150A, 150B, 150C, and 150D, second wiring members 160A, 160B, . . . , and second wiring members 170A, 170B, 170C, and 170D can correspond to the difference in the specifications in accordance with the difference of electrical components to which the first intermediate connectors 125, 126, 127, and 128 are connected. Thus, the above configuration contributes to a reduction in the overall number of part numbers in the wire harness.

For example, a part number corresponding to the difference in the specifications is set on a premise of the wire harness 700 illustrated in FIG. 6, for example, 32 part numbers need to be set as described above. In this case, when the difference in the specifications (increase in an optional member to be connected and optional transmission line, for example) occurs, the part number increases in an exponential manner. Thus, a problem may occur in many viewpoints such as a design, a manufacture, a storage management, a storage space in a wire harness manufacturing plant, for example. Actually, an upper limit needs to be established on the number of part numbers. As a result, a circuit which may be a redundant circuit needs to be assembled to correspond to the wire harness having each part number.

According to the example in the second embodiment, one part number as the first wiring member 120, eight part numbers as the second wiring members 140A, 140B, . . . , four part numbers as the second wiring members 150A, 150B, 150C, and 150D, four part numbers as the second wiring members 160A, 160B, . . . , and eight part numbers as the second wiring members 170A, 170B, 170C, and 170D. In this case, the setting of the 25 part numbers in total can correspond to the difference in the specifications (24 part numbers when focusing on the second wiring member). Thus, even when the linear transmission member included in the wire harness increases, the overall number of the part numbers can be reduced.

Figure 11:
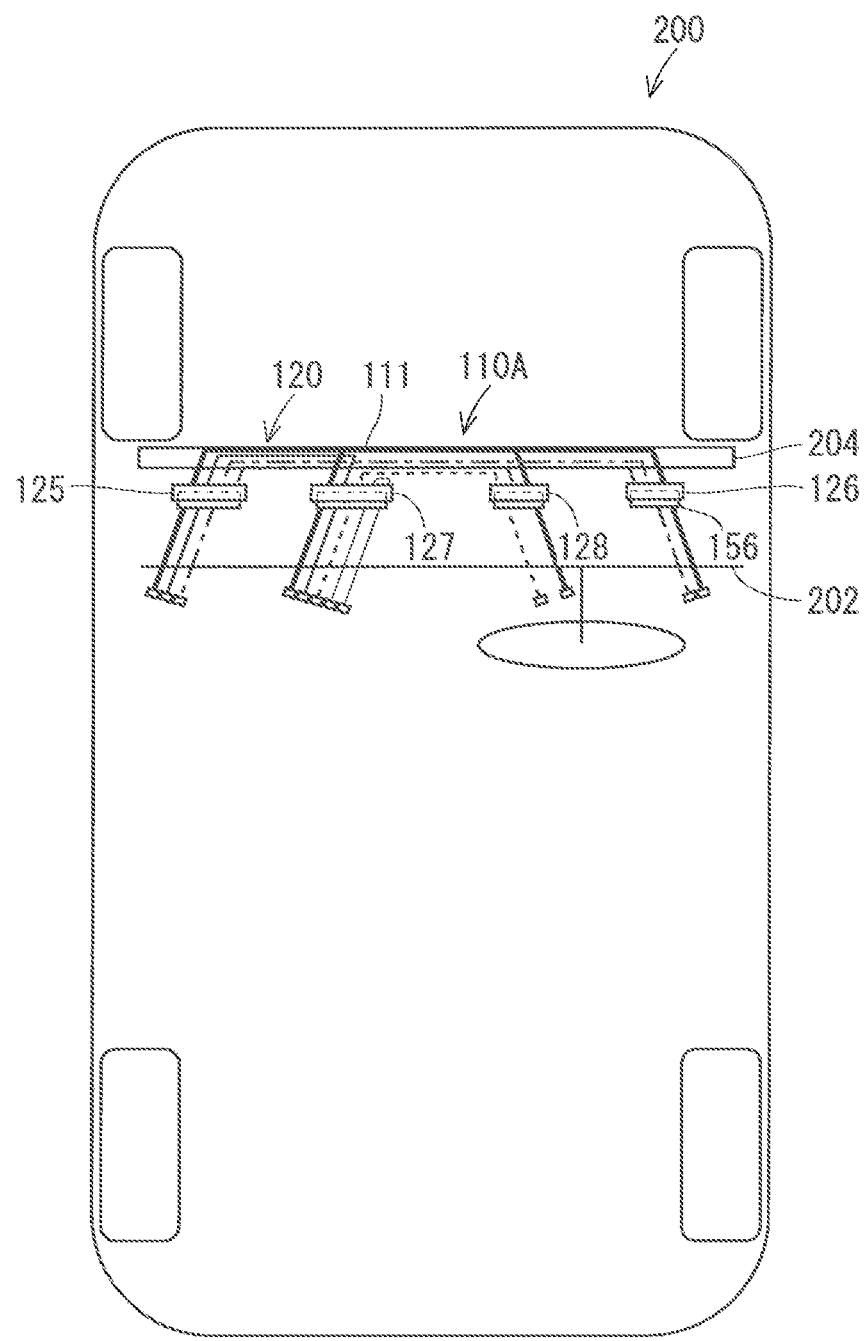
FIG. 11 A schematic view illustrating the wire harness disposed on an inner side of an installment panel in an automobile.
Figure 12:
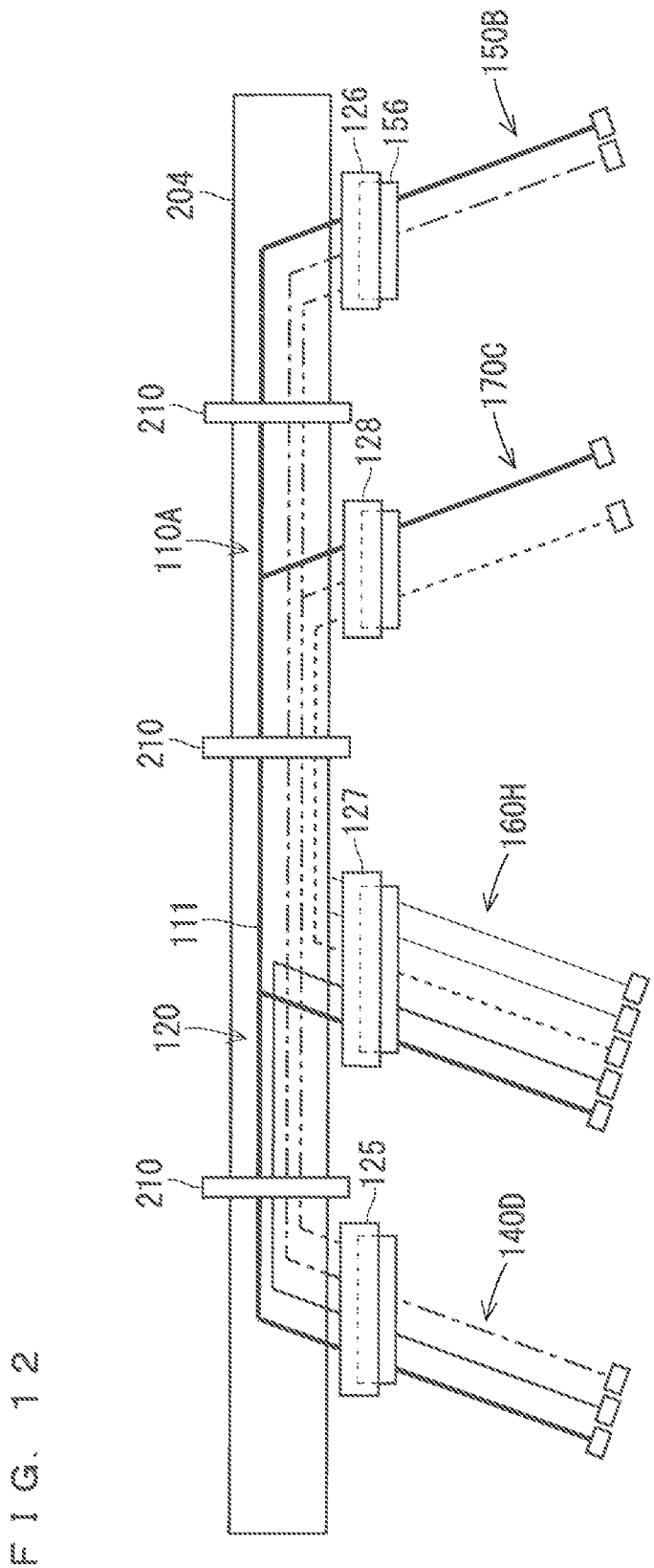
FIG. 12 A schematic view illustrating the wire harness supported along a reinforcement.

FIG. 11 is a schematic view illustrating the wire harness 110A disposed on an inner side of an installment panel 202 of the automobile 200. FIG. 12 is a schematic view illustrating the wire harness 110A supported along a reinforcement 204.

The automobile 200 includes the installment panel 202 on a front side of a driver seat and a passenger seat. The reinforcement 204 is provided on an inner side (a front side of a vehicle) of the installment panel 202. The reinforcement 204 is a member having an elongated shape, and is disposed along a vehicle width direction in a position in front of the installment panel 202. The wire harness 110A is supported along the installment panel 202.

Herein, the wire harness 110A includes a support part 210 supporting the first wiring member 120 on the inner side of the installment panel 202. Applicable as the support part 210 is a banding band and an adhesive tape, for example, wound around the main line 111 in the first wiring member 120 disposed along the reinforcement 204. The support part 210 may be a clamp (also referred to as a clip in some cases) attached to the first wiring member 120 to fix the vehicle. In this case, the clamp is inserted into and fixed to a fixing hole formed in the reinforcement 204, thus the first wiring member 120 is attached to the reinforcement 204.

The first wiring member 120 needs not be attached to the reinforcement 204. The first wiring member 120 may be fixed to an inner surface side (a rear surface side) of the installment panel 202 or a body in front of the installment panel 202 of the vehicle via a clamp for fixing the vehicle, for example.

The wire harness 110A is disposed in the inner side area of the installment panel 202 in the automobile 200, thus the wire harness 110A is assumed as the wire harness for the instalment panel 202. The large number of the electrical components are incorporated into the installment panel 202 and a surrounding area thereof, thus the wire harness 110A for the installment panel 202 has a large number of electrical components to be connected and also has a large difference in the specifications. Thus, it is possible to easily correspond to the difference in the specifications of automobiles with regard to the wire harness 110A for the installment panel 202 having the large difference in the specifications while enabling a reduction in a redundant circuit and a redundant terminal connector as much as possible.

The first wiring member 120, particularly, the main line 111 is supported along the reinforcement 204, thus a large part of the first wiring member 120 can be easily supported along a certain path stably. The positions of the first intermediate connectors 125, 126, 127, and 128 can be easily grasped using the reinforcement 204 as a lead. Thus, the second intermediate connector 156 can be easily attached to and detached from the first intermediate connectors 125, 126, 127, and 128 while supporting the first wiring member 120 along the reinforcement 204, thus the above configuration is excel in workability.

Figure 13:
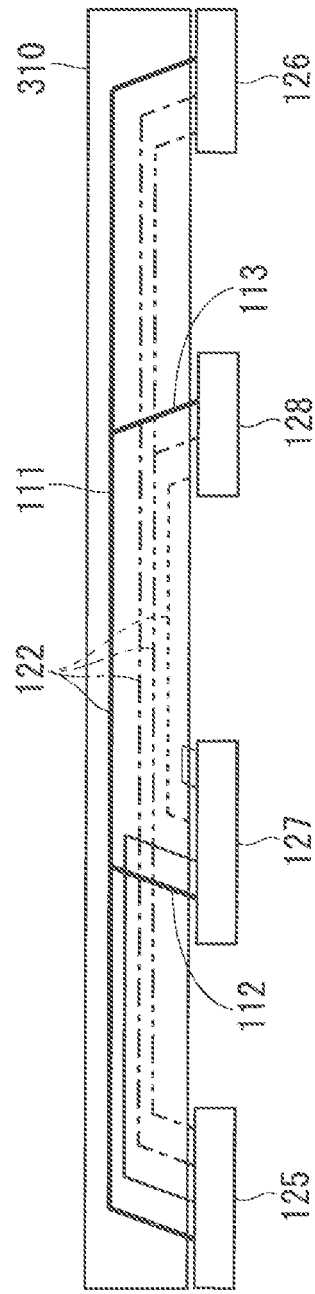
FIG. 13 A schematic view illustrating a plurality of first linear transmission members fixed to a sheet material.

FIG. 13 illustrates a case where the first wiring member 120 includes a sheet material 310 to which the plurality of first linear transmission members 122 are fixed.

Herein, portions constituting the main lines 111 in the plurality of first linear transmission members 122 in the first wiring member 120 are fixed in parallel with each other to the sheet material 310. The sheet material 310 is formed of a material containing resin such as polyvinyl chloride (PVC), polyethylene terephthalate (PET), and polypropylene (PP), for example. The sheet material 310 may be a sheet material with an inner portion evenly filled or a non-woven sheet, for example. The sheet material 310 may contain a material such as metal, for example. The sheet material 310 preferably has flexibility of easily bending in a thickness direction. The sheet material 310 may be a single layer or may be a plurality of stacked layers. When the sheet material 310 is the plurality of stacked layers, it is considered that a resin layer and a resin layer are stacked for example. It is also considered that a resin layer and a metal layer are stacked, for example.

The plurality of first linear transmission members 122 are fixed along a certain path on one main surface of the sheet material 310. Applicable as the above fixing state are a contact area fixation and a non-contact area fixation, or both fixations may be used together. Herein, the contact area fixation indicates that a portion where the first linear transmission member 122 and the sheet material 310 have contact with each other is stuck and fixed. The non-contact area fixation indicates the fixing state which is not the contact area fixation. For example, a sewing thread, the other sheet material, or an adhesive tape presses the first linear transmission member 122 toward the sheet material 310, or a sewing thread, the other sheet material, or an adhesive tape surrounds the first linear transmission member 122 and the sheet material 310, thereby holding the first linear transmission member 122 and the sheet material 310 to keep the first linear transmission member 122 and the sheet material 310 fixed to each other. In the description hereinafter, the first linear transmission member 122 and the sheet material 310 are in the state of the contact area fixation. Each description on the contact area fixation is also applicable to the non-contact area fixation as long as each member and material has a configuration to which the non-contact area fixation is not applicable.

Applicable as the configuration of the contact area fixation are a contact area indirect fixation and a contact area direct fixation, or both fixations may also be used together in different regions. Herein, the contact area indirect fixation indicates that the first linear transmission member 122 and the sheet material 310 are indirectly stuck and fixed via an adhesive agent, a gluing agent, and a double-sided adhesive tape provided therebetween. The contact area direct fixation indicates that the first linear transmission member 122 and the sheet material 310 are directly stuck and fixed without an intervention of the adhesive agent, for example, which is separately provided. Considered in the contact area direct fixation is that resin included in at least one of the first linear transmission member 122 and the sheet material 310 is melted, thus the first linear transmission member 122 and the sheet material 310 are stuck and fixed, for example. In the description hereinafter, the first linear transmission member 122 and the sheet material 310 are in the state of the contact area direct fixation. Each description on the contact area direct fixation is also applicable to the contact area indirect fixation as long as each member and material has a configuration to which the contact area indirect fixation is not applicable.

In forming the state of such a contact area direct fixation, the resin is considered to be melted by heat or a solvent, for example. That is to say, the state of the contact area direct fixation may be the state of the contact area direct fixation by the heat or the state of the contact area direct fixation by the solvent. The contact area direct fixation by the heat is preferable.

At this time, a means of forming the state of the contact area direct fixation is not particularly limited, but various means including a known means such as welding, fusion, and melting joint can be used. For example, when the state of the contact area direct fixation by the heat is formed by welding, various welding means such as ultrasonic welding, heating-pressurizing welding, hot air welding, and high frequency welding can be adopted. When the state of the contact area direct fixation is formed by these means, the first linear transmission member 122 and the sheet material 310 are in the state of the contact area direct fixation by these means. Specifically, when the state of the contact area direct fixation is formed by the ultrasonic welding, for example, the first linear transmission member 122 and the sheet material 310 are in the state of the contact area direct fixation by the ultrasonic welding. A portion where the state of the contact area direct fixation by the heat is formed by the welding (a fixing portion between the first linear transmission member 122 and the sheet material 310) may be referred to as a welding part, and herein, the fixing portion by the ultrasonic welding may be referred to as an ultrasonic welding part, and the fixing portion by the heating-pressurizing welding may be referred to as a heating-pressurizing welding part, for example.

In the case of the contact area direct fixation, only the resin on an outer periphery of the first linear transmission member 122 may be melted, or only the resin included in the sheet material 310 may be melted. In these cases, the resin which has been melted is stuck on an outer surface of the resin on the other side, and a relatively clear interface may be formed in some cases. In the case of the contact area direct fixation, both the resin around the first linear transmission member 122 and the resin included in the sheet material 310 may be melted. In this case, there may be a case where both the resins are mixed and a clear interface is not be formed. Particularly, the resin around the first linear transmission member 122 and the sheet material 310 include compatible resin such as the same resin material, for example, there may be a case where both the resins are mixed and a clear interface is not be formed.

In FIG. 13, the contact area direct fixation is performed on portions constituting the main line 111 in the plurality of first linear transmission members 122 disposed in parallel with each other on one main surface of the sheet material 310. The plurality of first linear transmission members 122 may be fixed while being stacked on one main surface of the sheet material 310.

The branch parts 112 and 113 branched from the main line 111 in the plurality of first linear transmission members 122 may be or may not be fixed on one main surface of the sheet material 310. For example, base end side portions of the branch parts 112 and 113 may be fixed to the sheet material 310. Accordingly, a branch direction of the branch parts 112 and 113 can be regulated to some degree.

The first intermediate connectors 125, 126, 127, and 128 on the end portions of the branch parts 112 and 113 are located outside an end edge of the sheet material 310. The first intermediate connectors 125, 126, 127, and 128 may be fixed to the sheet material 310.

In this manner, when the plurality of first linear transmission members 122 are fixed to the sheet material 310, the first linear transmission member 122 can be gathered as flatly as possible. Thus, the first wiring member 120 can be easily routed in a position having a limited wiring space.

Figure 14:
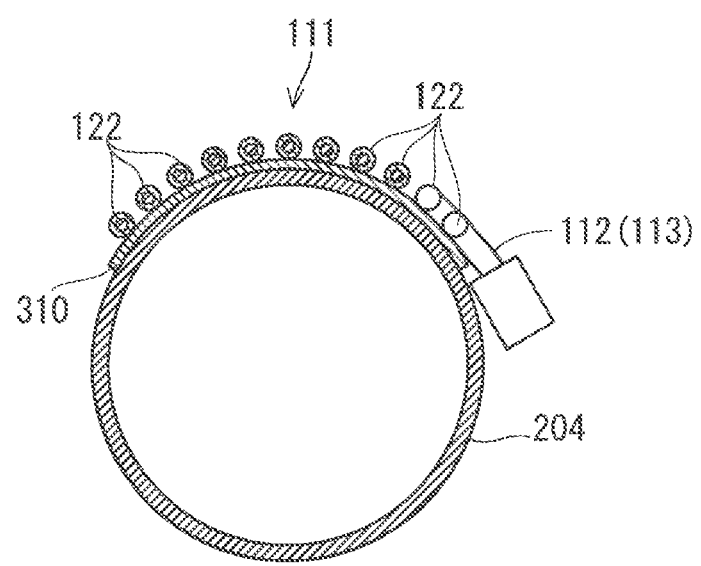
FIG. 14 A schematic view illustrating a first wiring member including the sheet material disposed along the reinforcement.

For example, as illustrated in FIG. 14, when the first wiring member 120 is disposed along the reinforcement 204, the sheet material 310 can be bent along an outer peripheral surface of the reinforcement 204 to be disposed along a longitudinal direction of the reinforcement 204. The above state can be kept by a support part which can bend and hold the first wiring member 120 along the outer peripheral surface of the reinforcement 204 such as an adhesive tape and a banding band, for example. In this case, the sheet material 310 and the plurality of first linear transmission members 122 can be disposed in a space as compactly as possible along the outer peripheral surface of the reinforcement 204.

In this case, the first intermediate connectors 125, 126, 127, and 128 are located near the outer peripheral surface of the reinforcement 204, and the positions of the first intermediate connectors 125, 126, 127, and 128 can be easily grasped using the reinforcement 204 as a lead.

Modification Example

In each embodiment described above, the first wiring member is used in common for all the specifications, however, when there are a large number of specifications, the first wiring member may be used in common for some specifications in the large number of specifications. In each embodiment described above, the first intermediate connector and the second intermediate connector connector-connecting the first wiring member and the second wiring member may be achieved by an incorporated structure of the plurality of connectors. In each embodiment described above, it is also applicable that added is a configuration that a branch line is branched from a main line of the first linear transmission member 22 and a connector is provided on a tip portion of the branch line so that the connector is directly connected to an electrical component.

Each configuration described in the above embodiments and modification examples thereof can be appropriately combined as long as they are not contradictory.

Although the present invention is described in detail, the foregoing description is in all aspects illustrative and does not restrict the invention. It is therefore understood that numerous modifications and variations can be devised without departing from the scope of the invention.

EXPLANATION OF REFERENCE SIGNS 10A, 10B; 110A, 110B, 110C wire harness
11; 111 main line
12; 112, 113 branch part
20; 120 first wiring member
22; 122 first linear transmission member
24; 125, 126, 127, 128 first intermediate connector 40A, 40B; 140A, 140B, 140C, 140D, 140H, 150A, 150B, 150C, 150D, 160A, 160B, 160C, 160H, 170A, 170B, 170C, 170D second wiring member
42; 152 second linear transmission member
54; 156 second intermediate connector
202 installment panel
204 reinforcement
210 support part
310 sheet material

The invention claimed is:

1. A wire harness, comprising:
a first wiring member including a plurality of first linear transmission members and a first intermediate connector, at least two first linear transmission members of the plurality of first linear transmission members being connected to the first intermediate connector; and
a second wiring member including at least one second linear transmission member and a second intermediate connector to which the at least one second linear transmission member is connected, wherein
in a state where the first intermediate connector and the second intermediate connector are connected to each other, a first part of the at least two first linear transmission members connected to the first intermediate connector is connected to all of the at least one second linear transmission member included in the second wiring member, and a second part of the at least two first linear transmission members is not connected to the at least one second linear transmission member.

2. The wire harness according to claim 1, wherein
the first wiring member includes a plurality of first intermediate connectors,
the wire harness includes a plurality of second wiring members, and
the second intermediate connector in each of the plurality of second wiring members is connected to a respective one of the plurality of first intermediate connectors.

3. The wire harness according to claim 1, wherein
in the first wiring member, the plurality of first linear transmission members are gathered in a state where a branch part is branched from a main line, and the first intermediate connector is provided on at least one of one end portion of the main line, another end portion of the main line, and an end portion of the branch part.

4. The wire harness according to claim 3, wherein
the first intermediate connector is provided in each of the one end portion of the main line, the another end portion of the main line, and the end portion of the branch part, and
the second intermediate connector in the second wiring member is connected to the first intermediate connector provided in each of the one end portion of the main line, the another end portion of the main line, and the end portion of the branch part.

5. The wire harness according to claim 3, wherein
the first intermediate connector is provided on the end portion of the branch part, and
a length dimension of the branch part is equal to or smaller than 5 cm.

6. The wire harness according to claim 1, wherein
the first wiring member includes a sheet material to which the plurality of first linear transmission members are fixed.

7. The wire harness according to claim 1, comprising
a support part for supporting the first wiring member in an inner side area of an installment panel.

8. The wire harness according to claim 7, wherein
the support part supports the first wiring member along a reinforcement.

9. The wire harness according to claim 1, wherein
the first wiring member includes, as the plurality of first linear transmission members, wiring members for all electrical components each having a possibility of connection in a plurality of specifications.

10. A method of manufacturing a wire harness, comprising:
preparing a first wiring member including a plurality of first linear transmission members and a first intermediate connector, at least two first linear transmission members of the plurality of first linear transmission members being connected to the first intermediate connector;
preparing a first type second wiring member and a second type second wiring member, one of which is selectively connected to the first intermediate connector, wherein each of the first type second wiring member and the second type second wiring member includes at least one second linear transmission member and a second intermediate connector to which the at least one second linear transmission member is connected, and the first type second wiring member and the second type second wiring member have different combinations of connection between the at least two first linear transmission members connected to the first intermediate connector and the at least one second linear transmission member in a state where the second intermediate connector is connected to the first intermediate connector; and
selecting one of the first type second wiring member and the second type second wiring member and connecting the second intermediate connector of the selected one of the first type second wiring member and the second type second wiring member to the first intermediate connector,
wherein when the first intermediate connector and the second intermediate connector of the first type second wiring member are connected to each other, a first part of the at least two first linear transmission members connected to the first intermediate connector is connected to all of the at least one second linear transmission member included in the second wiring member, and a second part of the at least two first linear transmission members is not connected to the at least one second linear transmission member of the first type second wiring member, and
when the first intermediate connector and the second intermediate connector of the second type second wiring member are connected to each other, the second part of the at least two first linear transmission members connected to the first intermediate connector is connected to the at least one second linear transmission member of the second type second wiring member.

11. A wire harness, comprising:
a plurality of first linear transmission members independently provided to correspond to a plurality of electrical components;
a first intermediate connector to which at least two first linear transmission members of the plurality of first linear transmission members are connected; and
at least one second linear transmission member including one end connected to one of the electrical components and another end connected to a second intermediate connector, wherein
via a connection of the first intermediate connector and the second intermediate connector, all of the at least one second linear transmission member is independently connected to a first part of the at least two first linear transmission members connected to the first intermediate connector and none of the at least one second linear transmission member is connected to a second part of the at least two first linear transmission members connected to the first intermediate connector, such that the one of the plurality of electrical components connected to the at least one second linear transmission member and the first part of the at least two first linear transmission members are connected to each other, and the one of the electrical components and the second part of the at least two first linear transmission members are not connected to each other.

12. A wire harness, comprising:

a first wiring member including a plurality of first linear transmission members and a first intermediate connector, at least two first linear transmission members of the plurality of first linear transmission members being connected to the first intermediate connector; and a first type second wiring member and a second type second wiring member, one of which is selectively connected to the first intermediate connector, each of the first type second wiring member and the second type second wiring member including at least one second linear transmission member and a second intermediate connector to which the at least one second linear transmission member is connected, wherein in a state where the first intermediate connector and the second intermediate connector of the first type second wiring member are connected to each other, a first part of the at least two first linear transmission members connected to the first intermediate connector is connected to all the at least one second linear transmission member included in the second wiring member, and a second part of the at least two first linear transmission members is not connected to the at least one second linear transmission member of the first type second wiring member, and in a state where the first intermediate connector and the second intermediate connector of the second type second wiring member are connected to each other, the second part of the at least two first linear transmission members connected to the first intermediate connector is connected to the at least one second linear transmission member of the second type second wiring member.

* * * * *